June 1, 1965 L. THORINGTON ETAL 3,186,819
APPARATUS FOR FORMING HELICAL GROOVES IN TUBES
Filed Aug. 25, 1961 2 Sheets-Sheet 2

INVENTORS
LUKE THORINGTON
ANDREW H. OLSEN
BY DONALD G. TRUTNER

ATTORNEYS

United States Patent Office 3,186,819
Patented June 1, 1965

3,186,819
APPARATUS FOR FORMING HELICAL GROOVES IN TUBES
Luke Thorington, Berkley Heights, Andrew H. Olsen, Jersey City, and Donald G. Trufner, Chatham, N.J., assignors to Duro-Test Corporation, North Bergen, N.J., a corporation of New York
Filed Aug. 25, 1961, Ser. No. 133,989
6 Claims. (Cl. 65—244)

This invention is concerned with novel methods and apparatus by means of which thin walled tubes such as the glass envelope of a fluorescent lamp may be deformed to provide in the wall of the tube one or more helical grooves.

A main object of the invention is to provide an apparatus by means of which helically grooved thin walled tubes can be formed with minimum manipulation of the tube in mounting it in the apparatus and effecting the required motion thereof.

An important object of this invention is to provide a machine which will support a thin walled glass tube on its longitudinal axis for rotation so as to straighten it out and hold it straight during processing.

Still another object of the invention is to provide in an apparatus of this type means for preheating and maintaining the glass tube at a desired working temperature for groove formation.

Other objects include a novel method for producing grooved glass tubes which have overall straightness.

Other and more detailed objects of the invention will be apparent from the following description of the embodiment thereof illustrated in the accompanying drawings.

A general object of this invention is to provide a machine by means of which one or more circumferentially displaced grooves may be formed in thin walled tubes made of a material which may be softened.

More specifically an object of the invention is to provide a novel method and apparatus by means of which the wall of a thin walled glass tube may be progressively softened along one or more helical paths to cause the wall to deform inwardly to provide a permanent helical groove or grooves in that wall.

Subsidiary to these objects are the objectives of this invention of providing a machine into which cylindrical glass tubes, for example, can be quickly and easily placed for rotation on their longitudinal axes. Heretofore in seeking these general objects means have been provided including chucks for holding the glass tubes for such rotation. In the interest of economy in manufacture it became desirable to provide some other method of supporting the glass tubes for rotation on their axes without the delay of chucking them. In accordance with this objective applicants propose to provide rotatable supports in the form of rollers arranged to provide a substantially V-shaped slot in which a glass tube is positioned and by means of which it is rotated on its axis.

An additional object of the invention is to provide a method and machine which will insure that the glass tubes are substantially straight throughout their length after they are grooved and further which are returned to a straight condition if they are not straight as received for processing.

A further object of the invention is to provide a rotating support for such glass tubes which will maintain their straightness during groove formation.

Finally, other objects of this invention are to provide means for preheating the glass tube in preparation for groove formation and to insure their overall straightness at the groove formation.

These and other more detailed objects are secured as will be apparent from the following description.

Figure 1:
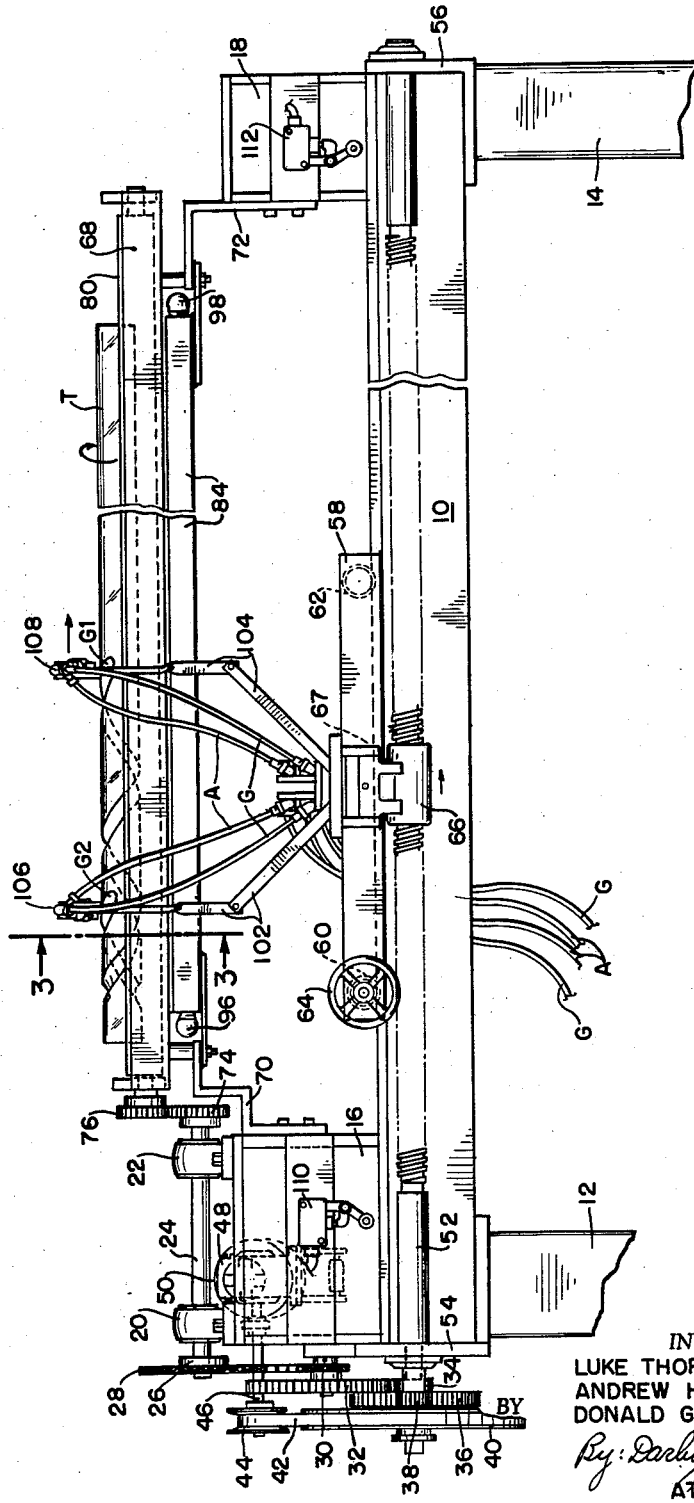
FIGURE 1 is a front elevational view of a machine in accordance with this invention with unessential parts partially broken away.
Figure 2:
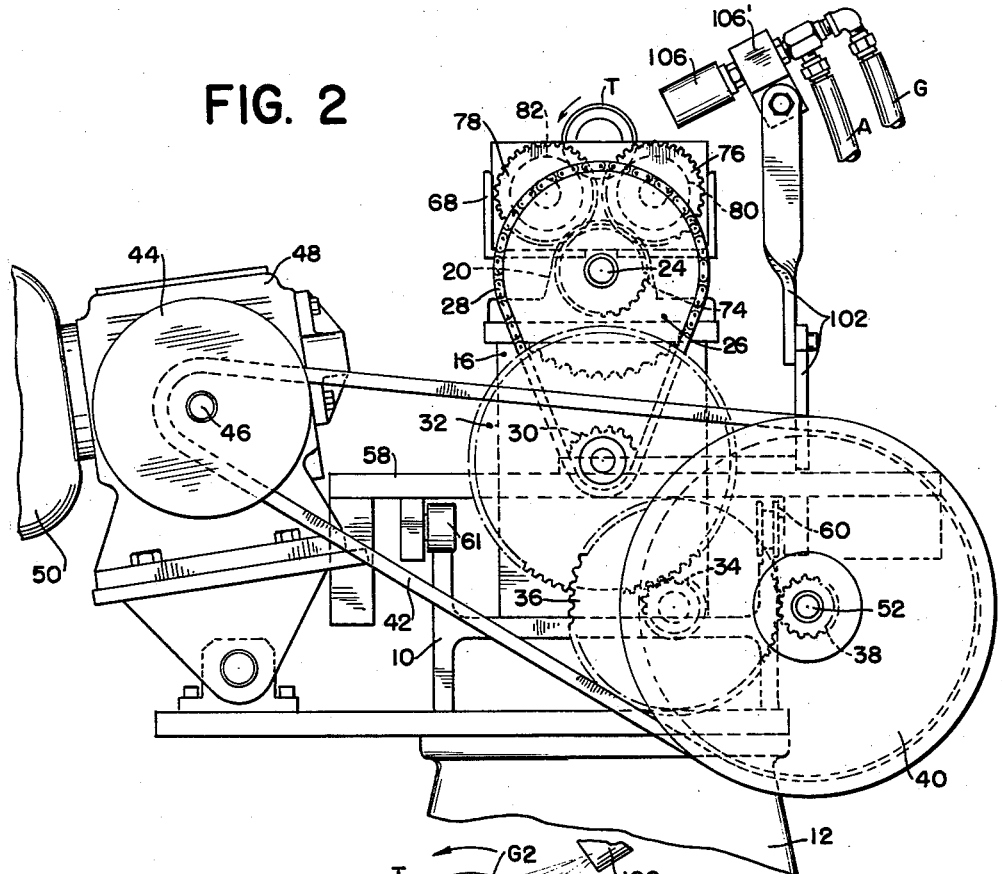
FIGURE 2 is a lefthand elevational view of the structure shown in FIGURE 1.

As shown in FIGURE 1, the machine includes a bed 10 which in the form illustrated, as will be seen from FIGURE 2, comprises an I-beam supported on a pair of side edges. The support for the beam is provided by pairs of suitably shaped legs 12 and 14 secured to the ends of the beam in any suitable manner. Supported on top of the beam at opposite ends are what may be termed the head stock 16 and the tail stock 18.

In turn supported on the head stock 16 are a pair of bearings 20 and 22, in which is journaled a shaft 24 lying in the plane of the longitudinal axis of the bed. Secured to one end of the shaft 24 is a driven sprocket 26 connected by a drive chain 28 with an intermediate sprocket 30. Sprocket 30 is journaled on a stub shaft supported by the head stock and is connected by a gear 32. The gear 32 meshes with a gear 34 likewise journaled on the stub shaft supported on the bed. Connected to the gear 34 is a larger gear 36 which in turn meshes with a pinion 38. The pinion 38 is secured to a lead screw shaft 52 journaled on plates 54 and 56 secured to the opposite ends of the bed 10. As is apparent the lead screw shaft 52 extends throughout the length of the bed, parallel thereto, and rotates on an axis in front of the bed.

Also secured to the shaft 52 is a V-belt pulley 40 connected by a V-belt 42 with a V-belt pulley 44. These pulleys, as will be well understood by engineers, may be of the variable type to effect adjustable speed rotation when desired. The pulley 44 is secured to a shaft 46 forming part of a speed reducing gear assembly 48. This gear assembly is driven by an electric motor 50.

At 58 is a carriage provided at the front at its opposite ends with rollers 60 and 62. These rollers, as is shown in FIGURE 2, are grooved to ride on a track formed on one of the flanges of the bed 10. At the rear of the carriage is a single roller 61 riding on the rear flange of the bed. As illustrated in FIGURE 1, a handwheel 64 connects with the associated roller 60 so that the carriage can be moved along the bed by hand. The half nut 66 is pivotally mounted at 68 on the front of the carriage so that it can be moved into and out of engagement with the threads of the lead screw 52.

Supported by fixtures 70 and 72 attached respectively to the head stock 16 and the tail stock 18, is a U-shaped trough member 68 which is positioned above the bed but extends parallel thereto. Journaled in suitable bearings in the end of the trough are a pair of cylindrical rollers 80 and 82 which may be of tubular form, as shown in cross-section in FIGURE 3.

On the ends of the rollers adjacent the head stock are respectively attached the gears 76 and 78 which mesh with a single gear 74 secured to the adjacent end of the driven shaft 24.

Also supported by the fixtures 70 and 72 is a preheating fuel burner which includes a tubular casing 84 of rectangular cross-section, see FIGURE 3, positioned below the trough 68 and extending parallel to its longitudinal axis. The top wall of the casing 84 is provided with a number of rows of apertures 86 which are positioned along the longitudinal gap 88 in the trough 68. As is clear from FIGURE 3, this gap is vertically centered with respect to the space, that is substantially the V-shaped slot formed by the rollers 80 and 82. Extending along the sides of the slot are a pair of barrier strips 90 which are arranged to substantially prevent circulation of ambient air in the path formed by the apertures 86 and the slot 88.

Within the casing 84 is a plate 92 which is positioned at the longitudinal center of the casing and serves to support the adjacent ends of a pair of manifolds extending in opposite directions therefrom and of which the manifold 94 is an example. These manifolds are simply tubes which are provided with a series of apertures at the bottom, as shown at 94' in FIGURE 3. The outward opposite ends of the manifolds are provided with combustible fuel connections 96 and 98, see FIGURE 1. Extending along the interior of the casing 84 is a horizontal baffle 100 supported in any suitable manner by the manifolds and provided with notches 100' along the outboard edges thereof adjacent the vertical walls of the casing 84. The baffles 100 which extend throughout the interior length of the casing 84 act as a diffuser or mixer to further insure that the mixture of fuel and air or oxygen supplied to the manifolds from any suitable source will be thoroughly mixed and evenly distributed to the top portion of the casing 84 from which the mixture passes through the multiplicity of apertures 86 and at which it is burned.

Figure 3:
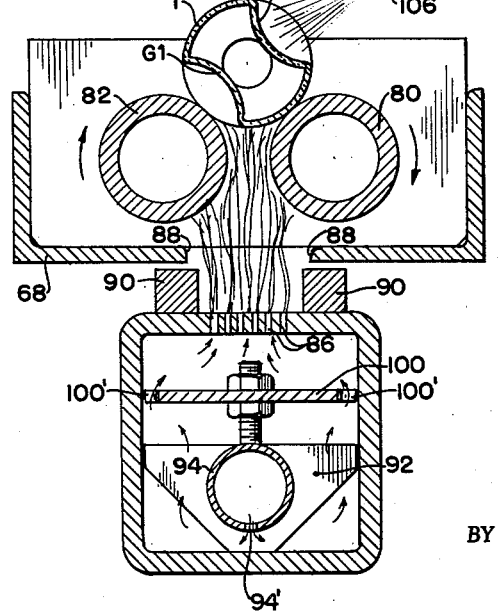
FIGURE 3 is a cross-sectional view taken on the line 3—3 of FIGURE 1.

As is clear from FIGURE 3 the burning fuel forms a ribbonlike flame in alignment with the gap between the rollers 80 and 82 so that the heat generated thereby will be properly directed onto the bottom surface of the glass tube T supported on the rollers. This arrangement insures the application of even heat to the glass tube throughout its length without substantial disturbance by drafts. This object is further insured by the trough 68 which surrounds the rollers and in part by the glass tube T and prevents uneven heating by circulating ambient air.

Supported on the carriage are torch holder assemblies 102 and 104 which respectively support the torches or fuel burners 106 and 108. As shown in FIGURE 2 in the case of the torch 106 it is mounted on a fixture 106' pivotally mounted on the support 102. There are also shown conduits A and G by means of which air or oxygen and a suitable burnable gas are supplied for admixture in the torch fixture. The other ends of the pipes A and G are connected to flexible extensions similarly marked, see FIGURE 1, by means of which the desired fuel mixture can be supplied to the torches from any suitable source.

Mounted on the head and the tail stock respectively are limit switches 110 and 112 positioned to be engaged at the respective ends of the carriage 58 so as to stop and/or reverse the motor 50 when the carriage reaches the end of its travel in either direction.

From the above description the operation of this machine as a mechanism will be apparent. However, in the interest of clarity it is noted that when the motor 50 is operating power will be delivered through the gear reduction assembly 48 to the drive pulley 44. This pulley in turn rotates the driven pulley 40 which being connected to the lead screw 52 causes it to revolve at a predetermined speed. In turn the shaft 24 is driven from the lead screw shaft through the gear train 38, 36, 34, 32, 30, chain 28 and sprocket 26. Sprocket 26 in turn rotates the shaft 24 which carries with it the gear 74. This gear, as illustrated in FIGURE 2, meshes with the gears 76 and 78 attached respectively to the rollers 80 and 82, causing them to rotate in the same direction. These rollers in turn will cause the glass tube T to rotate on its longitudinal axis when supported in the substantially V-shaped slot formed by the rollers. The torches are positioned to direct their flame, the shape of which is controlled, onto the wall of the tube T.

It is a fact that the groove will not form when the wall is softened unless the tube T rotates in a counter-clockwise direction for the position of the torches shown, which direction is indicated by an arrow in FIGURE 2. This means that the rollers 80 and 82 must both rotate in a clockwise direction.

In order to use this machine a smooth cylindrical glass tube T is placed on the rollers. With the motor 50 operating the tube will rotate on its longitudinal axis by frictional contact with the rollers 80 and 82. The flame from the preheater, previously ignited, directs heat as illustrated in FIGURE 3, upwardly against the area of the tube T exposed in the slot between the rollers 80 and 82. As the tube T is rotating it will be quickly heated throughout its full length to a desired predetermined temperature which will be determined by the nature and type of glass from which the tube is made. While these tubes are obtained in a substantially straight condition they are most usually not strictly straight. During the groove forming process the glass tube is heated to the point where it is sufficiently plastic so that it will sag into contact with the rollers 80 and 82 throughout its length.

Initially the machine is brought up to working temperature by heating the rollers 80 and 82. Thus the tubes T, during groove formation, are not only heated directly by the flame, but by radiation from the heated rollers which of course continue to absorb heat from the flame as the machine operates.

At the end of the preheating period, the torch 108 is ignited. At this time the carriage 58 is at its extreme lefthand position, the one which causes the torch 108 to direct its flame onto the wall of the tube T at a predetermined point displaced to the right of the extreme end of the tube T. The heated tube is further heated at the point of impact of the flame of torch 108 thereon. At this time the half nut 66 of the carriage is engaged with the lead screw 52 and the carriage proceeds to move slowly to the right in timed relation to the speed of rotation of the glass tube T so that the wall of the tube will be deformed inwardly along a helical path, forming the groove G1.

With one torch it is apparent that a single groove will be formed in the tube T. If a double groove is desired the torch 106 is ignited, preferably one and one-half revolutions after the ignition of the torch 108. The result is that a second groove G2 will start forming. This groove will be displaced one-half revolution from the groove G1 in this case.

The carriage proceeds along to the right until the torch 108 reaches the terminal point for the groove G1, whereupon the torch is shut off. Groove G2 continues to form for one and one-half additional revolutions until it reaches the position where the groove G2 is to terminate in circumferential alignment with the end of groove G1 but 180° displaced with respect thereto circumferentially. At this time torch 106 is shut off. Also at this time carriage 58 will actuate the limit switch 112 to stop the carriage 58, but not the bulb rotation.

Throughout the preheating and formation of the grooves the tube T is supported throughout its length by the rollers and the heating of the tube by the preheating burner is maintained at a temperature within close desired limits as determined by the characteristics of the glass of which the tube is formed.

The spacing of the parts a distance of 1½ pitches, in the case of a double groove tube, is preferred. The torches could have been placed much closer together so that groove G2 would start to form one-half revolution after the start of groove G1. However, it has been found that two parts working so close together overheat the glass tube and tend to distort the grooves and the tube. For this reason it is preferable to space them a distance equivalent to one and one-half revolutions as explained above.

It will be apparent that it is not necessary that the grooves be displaced circumferentially 180°. They may have other circumferential displacements, which would be asymmetric. It is likewise apparent that one, two, three or more grooves could be formed by varying the number of torches being used. Likewise it is apparent that the depth of the grooves can be varied by changing the speed of rotation of the tube and the elevation of the torches.

It goes without saying that the invention is not limited to the processing of glass tubes. Tubes of other heat-plasticizable materials may be similarly processed.

It is also apparent that the machine could be further mechanized to effect automatic operation throughout, including turning on and off the preheater and the torches. These and many other modifications can be readily made by those skilled in the art.

It is apparent therefore that the subject matter of this invention is best defined by the scope of the claims and is not to be limited by the specific embodiments selected for disclosure purposes.

What is claimed is:

1. A machine for forming a helical groove in the wall of a heat deformable tube, a pair of rollers supported for rotation on spaced parallel axes to form a substantially continuous V-shaped slot in which the tube is supported throughout the length, a carriage supported for back and forth movement on a path parallel to said rollers, a fuel burning torch supported on said carriage in a position to direct a spot of flame onto a tube supported in said slot by said rollers, and means for simultaneously rotating said rollers in the same direction and moving said carriage along said path in predetermined timed relation to the speed with which a tube is rotated by said rollers when supported in said slot to soften the tube wall along a helical path.

2. In the combination of claim 1, a housing surrounding said rollers and having a slot in its wall lying below said V-shaped slot, and means for generating and directing heat through said slots onto a tube supported on said rollers.

3. In the combination of claim 1, at least one additional torch supported on said carriage and longitudinally spaced from said first torch a predetermined distance whereby two helical grooves can be formed in the wall of a tube supported on said rollers.

4. In the combination of claim 1, means supported under said slot for applying heat to the tube throughout its length.

5. In the combination of claim 4, said heat applying means comprising a ribbon gas flame burner.

6. In the combination of claim 4, said heat applying means comprising a ribbon gas flame burner and means for protecting the flame against drafts.

References Cited by the Examiner

UNITED STATES PATENTS

| 1,912,405 | 6/33 | Ronci | 65—154 |
| 2,228,010 | 1/41 | Koenig | 65—272 |
| 2,822,501 | 2/58 | Poulter. | |
| 3,091,105 | 5/63 | Morrill | 65—271 |

FOREIGN PATENTS 637,943   10/36   Germany.

DONALL H. SYLVESTER, *Primary Examiner.*